Dec. 14, 1943.  A. J. KEIJZER  2,336,938
METHOD OF FORMING STEREOSCOPICALLY OBSERVABLE PICTURES
Filed April 4, 1940  3 Sheets-Sheet 1

Dec. 14, 1943.   A. J. KEIJZER   2,336,938
METHOD OF FORMING STEREOSCOPICALLY OBSERVABLE PICTURES
Filed April 4, 1940   3 Sheets-Sheet 2
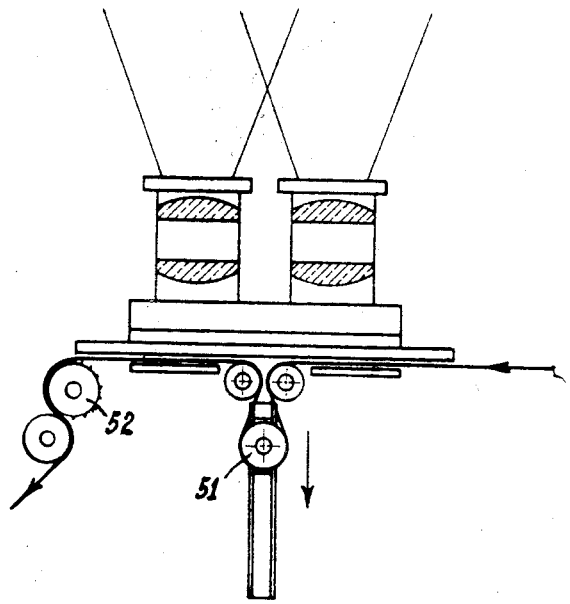
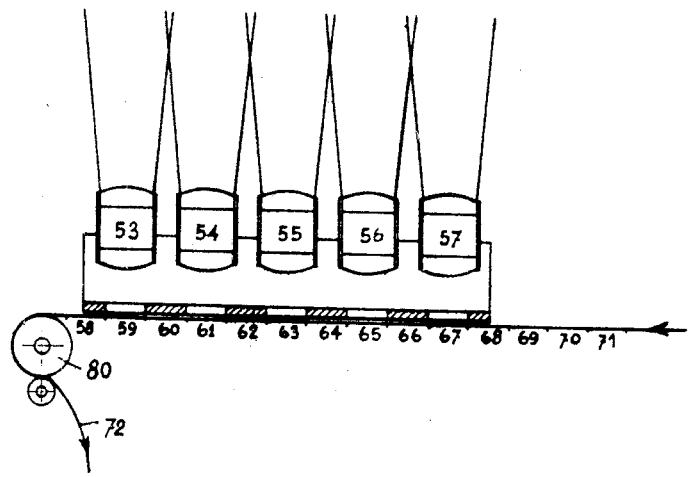

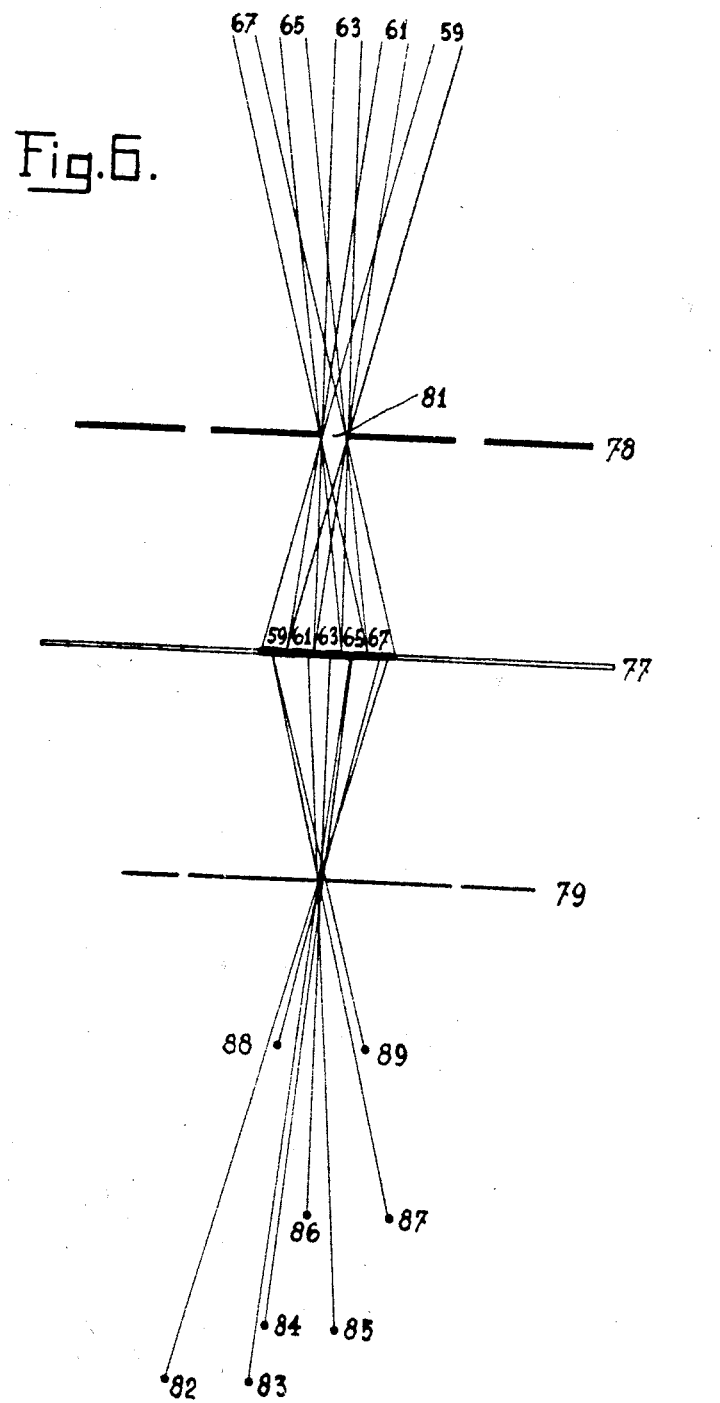

Patented Dec. 14, 1943

2,336,938

UNITED STATES PATENT OFFICE 2,336,938

METHOD OF FORMING STEREOSCOPICALLY OBSERVABLE PICTURES

Albertus Jacobus Keijzer, New York, N. Y.

Application April 4, 1940, Serial No. 327,872
In the Netherlands March 24, 1939

7 Claims. (Cl. 88—16.6)

The invention relates to taking and observing stereoscopic cinematographic air-photos for civil and military purposes.

The invention is based upon the fact that a stereoscopic image is seen if, by the application of selective means during projection, the left eye exclusively observes an image taken from a point which is located on the left of the point from which the picture was taken which is exclusively intended for the right eye.

If photos are taken from an airplane with a normal film camera, all successive pictures, owing to the horizontal displacement of the airplane, will be taken from points located one next to the other in a horizontal line. Two pictures which have been taken in succession in this manner may together produce a stereoscopic effect.

According to the invention the pictures obtained in this manner are projected to this end by special means so that the left eye will continuously and exclusively observe an image or a series of images taken to the left of the picture or the series of pictures exclusively intended for the right eye, or in other words the left eye and the right eye always observe simultaneously pictures which have been taken to the left and to the right of each other respectively. If for example the airplane moves over the land in a direction west-east and the film in the camera, the system of lenses of which is pointing downwards, moves in a direction at right angles to that of the airplane (i. e. north-south), then, if the most southerly part of the terrain is to be considered as the "bottom" of the picture, the left eye is to observe the images which have been taken first, while simultaneously the right eye is to observe the images that come next and consequently have been taken at a later moment.

In order to attain this, according to the invention two successive pictures of a film strip or of its copy, obtained in the above mentioned manner, are projected on a screen by means of a projector having two lens system. In said projecting apparatus the film strip is every time moved over a distance of one picture so that each picture is projected twice, viz. once by the one lens system and once by the other lens system. By applying selective means care can be taken that the left eye always observes exclusively a picture which has been taken to the left of the picture which simultaneously is exclusively observed by the right eye.

Both pictures may be projected side by side on a screen, either simultaneously or alternately, whereas by means of a prism- or mirror-device for both eyes (so that one eye can only observe the image intended for that eye), both pictures can be combined so as to form one image which is stereoscopic for the observer. Moreover in case of alternate projection of both pictures in one plane, both images can be combined into a stereoscopic image if the spectator for observing uses a synchronously alternating mechanical screening device which in succession screens off the line of vision of either eye, viz. the left eye when the right hand picture is projected, and conversely. Further the system of stereoscopic projection by means of polarizing filters or red-green filters may be applied. Finally without the necessity of the spectator holding a pair of spectacles or some other device directly before his eyes, the stereoscopic effect may be obtained by using one or two gratings during projection.

In the latter case the two pictures which have been taken one after the other are simultaneously projected on a screen at two different angles through a grating by means of the projector with two lens systems, in such a manner that both images are divided into alternating picture lines on the said screen (which may be made e. g. of ground glass). On the opposite side of the ground glass a second grating takes care that the left eye only observes the lines of which the left hand picture is composed and the right eye only the lines of the right hand picture.

If a grating is used as selective means according to the invention it is possible to increase considerably the freedom of movement of the head in lateral direction and to extend considerably in depth the so-called observation field by not projecting the film strip with a projector having only two lens systems but by increasing this number to three or more. By this means a greater number of pictures may be divided into picture lines simultaneously so that an observer, moving the head in lateral direction, always sees two other matched left hand and right hand picture lines with the left and the right eye respectively.

If for taking photographs from an airplane a television camera is used and the pictures taken in this manner are registered on a film or in any other manner at the receiving station on the ground or on board a ship only after the radio telegraphic transmission from the airplane, then it will be possible by using any grating-television system to apply the said grating division of the image for the stereoscopic effect, by which two successive pictures are seen as one image during projection. According to the invention the picture plane of each picture is then to be divided into picture lines either with the transmission or after the reception in such a manner, that the picture lines of a picture which has been taken afterwards (that is to say: next to it) are inserted between the lines of the picture which has been taken first. This picture in which, divided into picture lines, a first and a following picture (a left hand and a right hand image) are combined, can then be projected by a normal projector without an intermediate grating on a ground-glass screen and may be observed stereoscopically through a grating on the other side of the screen.

It is possible to render the pictures taken by the lens system of the television camera, directly stereoscopically visible at the receiving station on the earth without loss of time caused by first fixing the series of pictures on a film strip. In this manner it will be possible to observe stereoscopically at the receiving station a terrain while the airplane is flying over the same. For this purpose according to the invention a device is used which always transmits a picture together with a picture previously taken. To this end each picture which has been taken is transmitted twice, viz. once immediately and then once more—after it has passed through a retarding intermediate means—at the same time with a following picture which had been transmitted immediately and is then transmitted for the second time simultaneously with the succeeding picture, etc. In order to avoid the necessity for two different wave lengths for the simultaneous transmission of two pictures, it is also possible to transmit the series of pictures in "groups" of two, whereby in each "group" two stereoscopic component pictures always succeed each other immediately. A device producing simultaneously two pictures may also be arranged in the receiving station. In this case the airplane transmits the pictures in a normal manner in their normal sequence, but in the receiving station a picture is always projected immediately and thereupon once more together with a next picture. So in the receiving station a picture is once projected immediately and thereupon, after having passed along a retarding intermediate means, once more at the same time as the following picture which undergoes the same operation.

If the pictures transmitted from the airplane and converted into electric vibrations, instead of being directly converted into visible pictures or fixed on a film strip, are recorded on gramophone discs or other recording means, then these electrical recordings can also be projected in a simple manner as stereoscopical pictures. According to the invention to this end the gramophone record on which the pictures, sent by the airplane in normal sequence, have been recorded is scanned by two pick-ups following each other in the same groove. Conducted over separate amplifiers to two television projectors or to one double projector, two pictures which have not been taken at the same time can be combined at the same time so as to form one stereoscopic image and they can be observed as such by selective means. By simultaneously scanning the record by more than two pick-ups it is possible, with a grating as selective means, to apply the system according to which more than two picture lines are projected through one slit of the grating; the advantage of it is a greater liberty of movement of the observer and a greater field of observation.

The stereoscopic effect may be increased or decreased at will if for the pictures which are to be projected simultaneously, pictures are chosen which have been respectively taken from points which are located at greater or shorter distances apart from each other, in other words if pictures are projected which have been taken a longer or shorter time the one after the other.

If the pictures have been recorded on a normal film strip and in order to change at will the stereoscopical effect during the projecting operation, according to the invention a projector is used, the lens system of which can be displaced with respect to the film strip so that it is possible to project simultaneously pictures lying closely together or pictures which are further apart on the film strip. For attaining the same result one may also use a projector the objectives of which are located at a fixed distance from each other, but in which there is a variable loop or curve in the film between the picture windows.

In order to be in a position to influence the stereoscopical effect, the projector may be provided with more than one device for the interrupted transport of the film (so-called drums or catchers). In this case any picture for each window of the projecting machine is separately transported to the next window and consequently free loops are present between the windows. By adjusting the catchers or enlarging the loops, pictures of the film strip which are spaced apart to a greater or smaller extent, can be projected simultaneously and separated for both eyes by selective means.

If a device is used by which the pictures converted into radiotelegraphical picture signs are recorded on a gramophone disc or the like, it is possible according to the invention to control the signs reconverted into pictures at need, by moving apart or bringing more closely together the pick-ups scanning the recordings in the same groove one after the other. Then both eyes will observe pictures which have been taken a longer or shorter time, the one after the other, in other words the taking points of which were spaced apart further or more closely together.

If for recording the picture signs transmitted from the airplane, instead of gramophone records other means are used, for example the picture signs are recorded on light-sensitive emulsion or on a Celluloid-film which is covered by a black emulsion by means of the intensity system or the transversal system or the Philips-Miller system, according to the invention the same result can be obtained, viz. rendering visible simultaneously a plurality of pictures which have not been taken at the same time, by using a double or multiple scanning device which scans twice or more than twice the same series of signs. In order to increase the stereoscopic effect in that case the scanning means, that is to say the photoelectric cells are spaced farther apart, and conversely they are arranged more closely together in order to decrease the stereoscopic effect. It is a matter of course that instead of scanning one series of signs the same result may be obtained by synchronously scanning signs which have been recorded on more than one gramophone disc or other recording means, with the difference in time necessary to the desired stereoscopic effect. In this case the stereoscopic effect of the picture signs converted into pictures may be influenced in a simple manner by applying a so-called slip-device for each disc or band, to the device by which the discs or bands are rotated. This slip-device is put into operation a moment for rendering simultaneously visible the two images which are necessary for the stereoscopic effect and which have been taken at different moments. By the operation of said slip-device the discs or bands will be displaced a moment with respect to each other. As soon as the right position has been attained the slip-device is rendered inoperative after which the scanning of the discs or bands occurs synchronously.

The invention will now be elucidated with the aid of some drawings illustrating embodiments.

Fig. 4 is a schematic view of a projector with a film loop which is adjustable between the picture windows.

Fig. 5 is a schematic view of a projector having five objectives, and

Fig. 6 is a schematic representation of the simultaneous projection of more than two picture lines through one slit of the grating and of observing two stereoscopical component image lines through a slit of a second grating.

Figure 1:
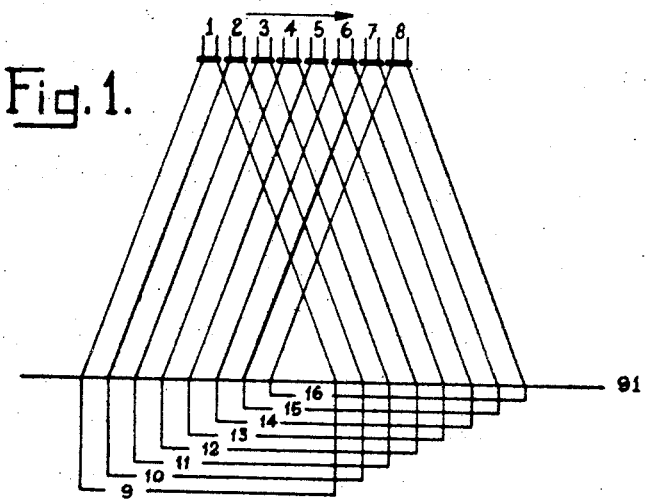
Fig. 1 is a schematic view of a film camera lens system which, by means of an airplane, is moved in horizontal direction over a tract of land.

In Fig. 1 the numerals 1 to 8 respectively, indicate the successive places of the objective of a film camera pointing downwards when horizontally moved over a tract of land 91 by an airplane in the direction indicated by an arrow. 9 is the portion of the tract of land photographed when the objective is in 1; 10 is the portion taken from point 2; 11 is the portion taken from 3, etc. Consequently if, when the pictures taken are projected, the left eye observes the picture 9 at the same time as the right eye observes the picture 10 a stereoscopic picture of the landscape is obtained. If the left eye observes picture 10 and the right eye picture 11 this portion is stereoscopic: the picture 10 which was originally intended for the right eye is now intended for the left eye, with as complementary stereoscopic component image for the right eye the picture 11 which has been taken from a spot spaced further to the right.

Further:

Left eye picture 11,
Right eye picture 12; then
Left eye picture 12,
Right eye picture 13; then
Left eye picture 13,
Right eye picture 14, etc.

This sequence of projection takes place if by means of a projector with two objectives two directly successive pictures of the film strip are always projected simultaneously.

In order to increase the stereoscopic effect it is possible, either by spacing the objectives of the projector further apart, or by arranging a loop in the film between the picture windows, to project simultaneously pictures which are spaced farther apart (that is to say taken with a greater difference in time or distance), e. g. in this sequence:

Left eye picture 9, together with
Right eye picture 12; then
Left eye picture 10, together with
Right eye picture 13; then
Left eye picture 11, together with
Right eye picture 14; etc.

Figure 2:
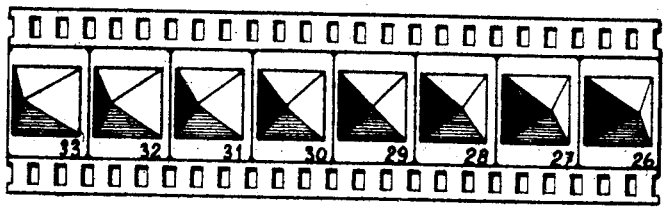
Fig. 2 is a film strip showing the pictures taken from an airplane.

In Figure 2 the numerals 26 to 33 respectively show pictures of a pyramid taken from an airplane flying over said pyramid, and corresponding with points 1 to 8 of Figure 1.

If when said film-strip is projected the left eye exclusively observes the picture 26 and simultaneously the right eye the picture 27, and then the left eye picture 27 simultaneously with the right eye the picture 28; thereupon the left eye 28 simultaneously with the right eye 29; then left eye 29 simultaneously with right eye picture 30, etc., then the observer will see a continuous stereoscopic picture of the view seen when flying over the pyramid. In order to increase the stereoscopic effect e. g. the following sequence could be chosen:

Left eye 26, together with right eye 28, then
Left eye 27, together with right eye 29, then
Left eye 28, together with right eye 30, etc.

Figure 3:
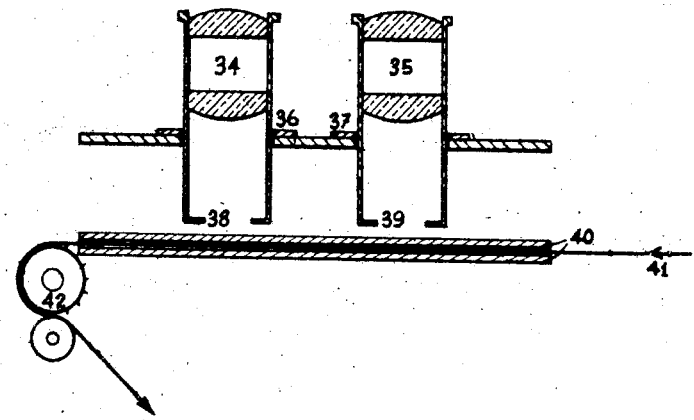
Fig. 3 is a schematic view of a projector having lens systems which may be displaced parallel to the film guide.

In Figure 3 the numerals 34 and 35 show projection objectives adapted to be moved towards and away from each other, parallel to the filmstrip, by means of sledges or slides 36 and 37. Together with said objectives the picture windows 38 and 39 are slidable along the open film channel 40. 41 is the film-strip which is regularly moved step-by-step over distances about equal to one film picture by a drum 42 which is driven by a Maltese (Geneva) cross. In the drawing at the same time two film pictures are projected which on the film strip are spaced apart over a distance of three film pictures. Assuming that the film-strip in question was exposed with a "camera velocity" of 20 pictures per second and that the velocity of the airplane was 200 kilometres an hour, both simultaneously projected pictures have been taken with a difference in time of 3/20 of a second or a difference in distance of almost 8.50 metres. It depends on the altitude of the airplane and the image angle of the camera-objective whether the said distance between the basic points from which the left hand and the right hand component picture have been taken suffice for the desired stereoscopic effect. It is self-evident that the stereoscopic effect, besides by choosing pictures which are spaced farther apart on the film-strip, can be influenced by choosing a definite speed of the camera with a definite flying-velocity and altitude.

Figure 4 schematically represents a projector in which two objectives are stationary with respect to the film channel. By displacing the pinion 51 in the direction of the arrow shown in the drawings it may be obtained that two pictures of the film strip which are spaced farther apart are simultaneously brought before the windows if the film is shifted over a distance of one film picture by means of the drum 52. The adjusting device for the pinion 51 may be provided with a scale, indicating which pictures are simultaneously projected in a definite position (viz. how many pictures are between the windows).

In Figure 5 the numerals 53, 54, 55, 56, 57 represent the five objectives of a projector arranged one next to the other, in conjunction with a grating used as a selective means. The pictures 59, 61, 63, 65, and 67 of the film-strip 72 are projected at the same time. After the film has been moved by the drum 80 along a distance of one film picture the pictures 60, 62, 64, 66 and 68 are projected simultaneously, etc.

In Figure 6 it is shown schematically how picture lines of the pictures 59, 61, 63, 65, and 67 of Figure 5 are projected on a screen 77 of ground glass through a slit 81 of the grating 78. Through the grating 79 at the side of observation of the screen, the left eye of the observer sees exclusively the picture line 67, the right eye the picture line 65, if the left eye is at 82 and the right eye at 83. If the left eye is at 84 and the right eye at 85 the left eye observes the picture line 65 and the right eye the picture line 61.

If the left eye and the right eye of the observer are at 86 and 87 respectively, picture line 63 is visible to the left eye and picture line 59 to the right eye respectively. The left eye at 88 observes the picture line 67, the right eye at 89 observes picture line 59. This explains how, when more than two pictures are projected at the same time, in the present case five pictures, the field of observation is considerably increased in all directions. Since with the present system for stereoscopic air-photos, even if five pictures are used at the same time for projection, the necessary quantity of film material is not greater than with normal non-stereoscopic pictures, this application of the invention with a grating as selective means has practical advantages.

I claim:

1. The method of forming stereoscopically observable cinematographic pictures by making use of a single film strip bearing a series of conventional type cinematographic pictures of a landscape as viewed in flight over the landscape, comprising: projecting the pictures cinematographically from said strip onto screen areas, concurrently again similarly projecting pictures from said strip onto adjacent screen areas, the latter projection being from a portion of the strip somewhat spaced from the portion from which said first mentioned projection is being accomplished, and separating the resulting projected images as projected from said first mentioned portion from those projected from said second mentioned portion for selective viewing respectively by the two eyes of the observer.

2. The method of forming stereoscopically observable cinematographic pictures with a variable degree of stereoscopic effect, by making use of a single film strip bearing a series of conventional type cinematographic pictures of a landscape as viewed in flight over the landscape, comprising: projecting the pictures cinematographically from said strip onto screen areas, concurrently again similarly projecting pictures from said strip onto adjacent screen areas, the latter projection being from a portion of the strip somewhat spaced from the portion from which said first mentioned projection is being accomplished, varying such spacing in accordance with the desired degree of the stereoscopic effect, and separating the resulting projected images as projected from said first mentioned portion from those projected from said second mentioned portion for selective viewing respectively by the two eyes of the observer.

3. The method of forming stereoscopically observable pictures by making use of a sequence of motion picture images of conventional type taken of a landscape from a succession of points along a path of travel past the landscape, which method comprises: projecting said images in rapid succession on a screen, meanwhile again similarly projecting on such screen the images of the same series, the latter projection at each moment being from a portion of the series spaced from the portion from which said first mentioned projection is being accomplished, and dividing the resulting projected images by a grating into image strips with the strips projected from said first mentioned portion alternating with strips projected from said second mentioned portion.

4. The method of forming stereoscopically observable pictures by making use of a sequence of motion picture images of conventional type taken of a landscape from a succession of points along a path of travel past the landscape, which method comprises, projecting said images in rapid succession on a screen, meanwhile again similarly projecting on such screen the images of the same series, the latter projection at each moment being from a portion of the series spaced by a variable loop including more than one picture frame from the portion from which said first mentioned projection is being accomplished, and separating the resulting projected images as projected from said first mentioned portion from those projected from said second mentioned portion for selective viewing respectively by the two eyes of the observer.

5. The method of forming stereoscopically observable pictures by making use of a sequence of motion picture images of conventional type taken of a landscape from a succession of points along a path of travel past the landscape, which method comprises: projecting said images in rapid succession on a screen, meanwhile again similarly projecting several times on such screen the images of the same series, each such projection at each moment being from a portion of the series spaced from the portions from which the other projections are being accomplished, and utilizing grating means to divide the resulting projected images into strips and to separate the strips of one projection from those of the other projections and for selective viewing of corresponding stereoscopic pairs of the strips.

6. In a method for forming stereoscopically observable pictures by making use of a single film strip bearing a series of conventional type cinematographic pictures of a scene as viewed in rapid travel past the scene, the steps comprising projecting the pictures cinematographically from said strip onto a screen, meanwhile again projecting the same pictures cinematographically from said strip onto the screen, the latter projection being from a portion of the strip somewhat spaced from the portion from which said first mentioned projection is being accomplished, and separating the screen images resulting from the first projection from those resulting from the second projection for selective viewing, by the left eye, of pictures which respectively have been taken at points to the left of the points of taking of pictures which are meanwhile being selectively viewed by the right eye.

7. In a method for forming stereoscopically observable pictures by making use of a single film strip bearing a single series of conventional type cinematographic pictures of a scene as viewed in rapid travel past the scene, the steps comprising projecting the pictures cinematographically from said strip onto a screen, meanwhile again projecting the same pictures cinematographically from said strip onto the screen, the latter projection being from a portion of the strip somewhat spaced from the portion from which said first mentioned projection is being accomplished, utilizing for said first mentioned projection, light which is of a character different from that used for the latter projection, and selectively viewing with the aid of light filtering means, by the two eyes of the observer respectively, the screen images resulting from the first projection and those resulting from the second projection.

ALBERTUS JACOBUS KEIJZER.